United States Patent [19]

Scheffee

[11] Patent Number: 6,116,641
[45] Date of Patent: Sep. 12, 2000

[54] DUAL LEVEL GAS GENERATOR

[75] Inventor: Robert S. Scheffee, Lorton, Va.

[73] Assignee: Atlantic Research Corporation, Gainesville, Va.

[21] Appl. No.: 09/010,541

[22] Filed: Jan. 22, 1998

[51] Int. Cl.⁷ .......................... B60R 21/26; B60R 21/32
[52] U.S. Cl. ..................... 280/736; 280/737; 280/741
[58] Field of Search ............................. 280/734, 736, 280/737, 741, 742; 137/68.22, 68.23; 222/5

[56] References Cited

U.S. PATENT DOCUMENTS

| | | | |
|---|---|---|---|
| 3,042,559 | 7/1962 | Hass et al. | 149/47 |
| 3,613,597 | 10/1971 | Warren | 149/2 |
| 3,629,021 | 12/1971 | Lyerly | 149/50 |
| 3,649,045 | 3/1972 | Smith et al. | 280/150 |
| 3,758,131 | 9/1973 | Stephenson | 280/150 AB |
| 3,773,353 | 11/1973 | Trowbridge et al. | 280/150 |
| 3,774,807 | 11/1973 | Keathley et al. | 223/3 |
| 3,797,854 | 3/1974 | Poole et al. | 280/150 |
| 3,811,358 | 5/1974 | Morse | 86/20 |
| 3,905,515 | 9/1975 | Allemann | 223/3 |
| 3,909,324 | 9/1975 | Niles | 149/76 |
| 3,912,562 | 10/1975 | Garner | 149/41 |
| 3,929,530 | 12/1975 | Niles | 149/84 |
| 3,956,040 | 5/1976 | Tezuka | 149/41 |
| 4,128,443 | 12/1978 | Pawiak et al. | 149/71 |
| 4,420,931 | 12/1983 | Anderson | 60/219 |
| 4,732,626 | 3/1988 | Edamura et al. | 149/21 |
| 4,948,439 | 8/1990 | Poole et al. | 149/46 |
| 5,060,974 | 10/1991 | Hamilton et al. | 280/736 |
| 5,145,535 | 9/1992 | Patrick | 149/109 |
| 5,215,721 | 6/1993 | Tasaki et al. | 422/165 |
| 5,257,819 | 11/1993 | Frantom et al. | 280/737 |
| 5,290,060 | 3/1994 | Smith | 280/737 |
| 5,400,487 | 3/1995 | Gioutsos et al. | 280/735 |
| 5,411,615 | 5/1995 | Sumrail et al. | 149/47 |
| 5,431,103 | 7/1995 | Hock et al. | 102/287 |
| 5,433,475 | 7/1995 | Kokeguchi | 280/736 |
| 5,439,251 | 8/1995 | Onishi et al. | 280/741 |
| 5,441,303 | 8/1995 | Rozanski | 279/738 |
| 5,482,579 | 1/1996 | Ochi et al. | 149/83 |
| 5,503,806 | 4/1996 | Fulmer et al. | 422/164 |
| 5,551,725 | 9/1996 | Ludwig | 280/737 |
| 5,564,743 | 10/1996 | Marchant | 280/741 |
| 5,613,702 | 3/1997 | Goetz | 280/735 |
| 5,630,619 | 5/1997 | Buchanan et al. | 280/741 |
| 5,762,369 | 6/1998 | Mooney | 280/741 |
| 5,794,973 | 7/1998 | O'Loughlin et al. | 280/737 |
| 5,803,494 | 9/1998 | Headley | 280/741 |
| 5,893,583 | 4/1999 | Blumenthal | 280/737 |

FOREIGN PATENT DOCUMENTS

WO 95/25709   9/1995   WIPO .

*Primary Examiner*—J. J. Swann
*Assistant Examiner*—Christopher D Bottorff
*Attorney, Agent, or Firm*—Nixon & Vanderhye PC; Frank P. Presta

[57] ABSTRACT

In order to allow for at least two different rates of air bag inflation a gas generator is provided with a single pyrotechnic charge which is disposed in a chamber in which argon or a similar type of non-toxic inert gas is stored under pressure. The chamber is closed off by two or more burst discs, only one of which is not exposed to a selectively ignitable squib. The non-exposed burst disc is arranged to breach when the pyrotechnic charge is ignited and increases the gas pressure in the chamber to a predetermined pressure. Each other disc is arranged to withstand the predetermined pressure and requires weakening by exposure to the heat from an associated squib before breaching will occur. The hybrid compressed gas/pyrotechnic pressure generation is such that the rate of air bag inflation varies essentially in proportion to the area of the exit port or ports which are opened by the breach of the burst disc or discs. By limiting the number of burst discs which are breached, the exit port area and the rate of air bag inflation/deployment can be controlled for slow speed collisions. Breaching more or all of the discs maximizes port area and increases the rate of pressurization to a level suitable for high speed collisions.

16 Claims, 3 Drawing Sheets

DUAL LEVEL GAS GENERATOR

BACKGROUND OF THE INVENTION

1. Field of the Invention

The present invention relates generally to a gas generating device and more specifically to a gas generating device which can selectively release gas at different rates and thus enable an air bag or the like type of inflatable safety restraining device, to be deployed at different speeds in accordance with different vehicle velocities.

2. Description of the Related Art

Recently, there has been a demand for controlling the rate of inflation of safety devices such as air-bag restraint systems, in accordance with variables such as passenger size and the velocity of the vehicle at time of collision. In the case of a low speed accident, the passenger or passengers will tend to be displaced within the vehicle (e.g. thrown forward) with far less force than in the case wherein a collision occurs at a relatively high speed. Accordingly, since an air bag requires a given amount of gas to achieve full deployment (inflation) and proper pressurization, if a passenger is being displaced within a vehicle under the influence of relatively small forces, then there is more time available to fully deploy the restraining air bag than in the case of a high speed crash. Therefore, the rate of inflation can be lower than that at which is necessary under high speed conditions.

In order to achieve the two speed inflation it has been proposed in U.S. Pat. No. 3,773,353 to Trowbridge et al. to provide two separate charges and to ignite one in the event that a slow inflation is required and to ignite both in the event of a high speed collision, thus achieving the very rapid inflation and deployment of the air bag which is necessary under such circumstances. In this device the charges are arranged within a housing which is filled with a non-toxic gas under pressure. This housing is sealed by a burst plate that is punched out by a piston and rod type of arrangement when a first of the two charges is detonated. This arrangement however, suffers from the drawback of being relatively complex and therefore, relatively expensive. For example, no less than three burst plate arrangements and two charges are necessary along with a housing arrangement which allows the two different charges to be separately stored and separately exposed to ignition devices such as squibs.

U.S. Pat. No. 3,905,515 to Allemann discloses another two-stage inflator assembly which utilizes two separate charges and which disposes the charge in a chamber which is used to store a non-noxious gas under pressure. However, this arrangement is even more complex than that in U.S. Pat. No. 3,773,353. In this arrangement a portion of the burst disc forms the head of a slidable shuttle valve member which is projectable into an exhaust passage to partially throttle the outflow of gases following a detonation of one or both of the two charges.

SUMMARY OF THE INVENTION

It is an object of the present invention to provide a simple inexpensive gas generator for an air bag or the like type of inflatable restraint device, which allows the device to be inflated at least at two different rates and thus permit the deployment in accordance with a sensed vehicle speed.

It is a further object of the present invention to provide a gas generator for an automotive safety restraint system such as a air bag which requires only a single charge which is ignited in response to a collision and which controls the rate of inflation using a multi-burst disc arrangement wherein all but one of the discs are opened in response to the application of a squib or like type of disc weakening device.

In the case wherein solid propellants are used to generate the bag inflating gases, the solid fuel is combusted in a choked or throttled combustion chamber wherein the exit port area is fixed. With pyrotechnic generators the flow rate of gas is inversely proportional to the port area. Accordingly, increasing port area results in a decreased flow rate and retards bag inflation. Hence, a large port is required for low speed collisions while a smaller one is required in the case of a higher speed accident.

On the other hand, in hybrid arrangements wherein pyrotechnic gas generation is used in combination with a source of compressed gas, and wherein the propellant combustion produces are mixed with compressed gas (e.g. argon) in the gas storage bottle in a manner which raises the temperature and pressure in the container, the mixture ratio of the compressed gas and combustion products, which determine the orifice coefficient, varies in a complex manner with respect to time. Numerical solutions to the flow equation show that the flow rate is proportional to the area of the port.

The invention is based on the concept of using a hybrid pyrotechnic/compressed gas arrangement and varying the port area in a manner which allows the flow rate to be controlled to at least two different levels and thus allow the inflation rate of an air bag to controlled to at least a fast rate and a slow rate. That is to say, by using a hybrid arrangement wherein a gas under pressure is provided in combination with a pyrotechnic charge, which establishes a situation wherein the flow rate is proportional to the area of the port through which the gases are discharged, it is possible to selectively open only one a plurality of ports in the event that a slow inflation is required, while increasing the number of ports which are opened in the event that a faster inflation and deployment rate is necessary.

In brief, the above objects are achieved by an arrangement wherein a gas generator is provided with a single charge which is disposed in a chamber in which argon or similar type of non-toxic inert gas is stored under pressure. The chamber is closed off by two or more burst discs, only one of which is not exposed to a selectively ignitable squib. The non-exposed burst disc is arranged to breach when the pyrotechnic charge is ignited and drives the gas pressure in the chamber above a predetermined tolerance limit. The other disc or discs are arranged to withstand this pressure and require weakening by exposure to the heat from an associated squib before breaching will occur.

The hybrid compressed gas/pyrotechnic pressure generation is such that the rate of air bag inflation varies essentially in proportion to the area of the port or ports which are opened by burst disc breaching. By limiting the number of burst discs which are breached, the port area and the rate of air bag inflation/deployment can be controlled for slow speed collisions. Breaching all of the discs maximizes port area and maximizes the rate of pressurization to a level suitable for high speed collisions. On the other hand, breaching of a selected number of discs can permit the inflation rate to be controlled to that which is more suited to an intermediate speed collision.

More specifically, a first aspect of the present invention resides in an inflation device for a vehicle safety restraint comprising: a vessel; a partition dividing the interior of the vessel into a first chamber and second chamber, the first chamber being hermetically sealed, the second chamber being vented by way of a manifold exit opening; a pyrotechnic charge disposed in the first chamber; means for selectively igniting the pyrotechnic charge; a predetermined amount of a predetermined gas stored in the first chamber under a first predetermined pressure; first burst disc means closing a first port which communicates the first and second chambers, the first burst disc being adapted to fail upon the pressure in the first chamber reaching a second predetermined pressure; second burst disc means closing a second port which communicates the first and second chambers; and means for selectively inducing the second burst disc to fail under a pressure which is proximate the first predetermined pressure.

A second aspect of the invention resides in an inflation device for use in a vehicle restraint system having an inflatable restraint member, comprising: a first burst disc operatively disposed between a source of gas under pressure and a discharge opening, the first burst disc being adapted to fail under a predetermined pressure to open a first port and permit communication between the source of gas under pressure and the discharge opening; a second burst disc operatively disposed between the source of gas under pressure and the discharge opening, the second burst disc being adapted to fail under a pressure in excess of the predetermined pressure and open a second port; and means for reducing the structural strength of the second burst disc to a degree that it will fail under the predetermined pressure and open the second port.

A third aspect of the invention resides in a method of controlling the inflation of an inflatable safety restraint device comprising the steps of: producing gas under pressure by igniting a pyrotechnic charge in a volume of pressurized gas; breaching a first burst disc and opening a first port by exposing the first burst disc to the gas under pressure; allowing gas to be released at a rate which is essentially proportional to the area of the first port; reducing the structural strength of a second burst disc in response to the detection of a vehicle speed in excess of a first predetermined speed to induce the second burst disc to breach and open a second port under the application of the gas under pressure; and allowing gas to be released through both of the first and second ports and at a rate which is essentially proportional to the combined areas of the first and second ports.

BRIEF DESCRIPTION OF THE DRAWINGS

The various features and attendant advantages of the present invention will become more clearly appreciated as a description of the preferred embodiment is given in conjunction with the appended drawings wherein.

DETAILED DESCRIPTION OF THE PREFERRED EMBODIMENTS

Figure 1:
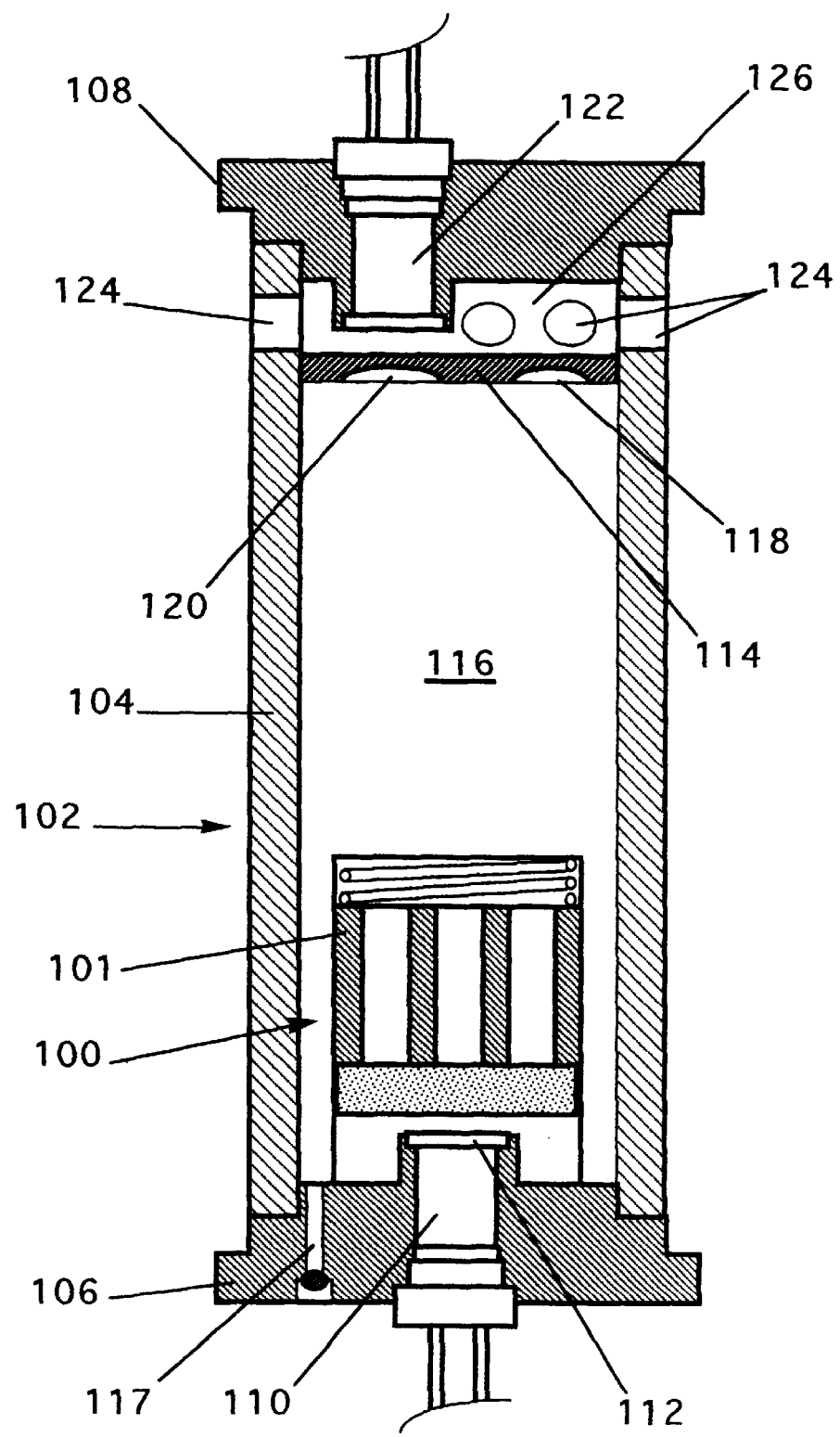
FIG. 1 is a cross-sectional view of an embodiment of the present invention.

FIG. 1 shows an embodiment of the invention wherein a gas generator device 100, which includes a pyrotechnic charge 101, is supported in a cylindrical steel housing or pressure vessel 102 which, as shown, is basically comprised of a length of cylindrical pipe 104 which is closed by two cap-like end members 106, 108 that are fixed (e.g. welded) in position. A squib or similar type of ignition device 110 and an ignition disc 112 are disposed in the first end member 106 in close proximity to the pyrotechnic charge 101.

A partition plate 114 is disposed in the pipe 104 proximate the second end member 108 so as to be relatively distal from the squib 110. The partition plate 114 is fixed in position in a manner to define a chamber 116 within the pipe 104 which is filled with a suitable non-toxic gas, such as argon or helium, under pressure, and hermetically sealed. A filling port 117 is provided in the first end member 106 to facilitate the charging of the chamber 116 with the selected non-toxic gas after the device is assembled and the various components are secured together.

Figure 2:
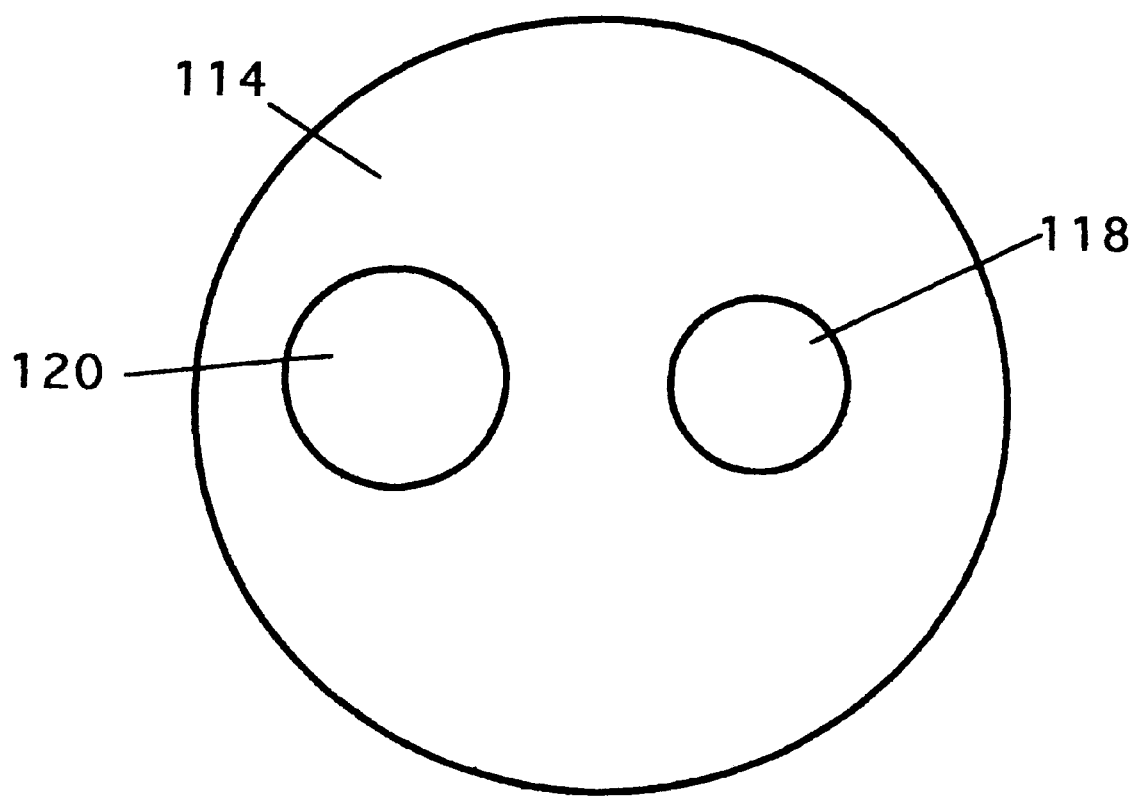
FIG. 2 is a schematic end view of a plate in which the burst discs, which form a vital part of the embodiment shown in FIG. 1, are formed, and which shows the disposition of the burst discs and the manner in which a further disc could be provided.

As shown in FIGS. 1 and 2, the partition plate 114 is formed with two separate burst discs 118, 120. The first disc 118 is adapted to fail and breach under the application of a predetermined pressure, while the second disc 120 is designed to require either a higher pressure or some form of weakening before failure will take place. A second squib 122 is mounted in the second end member 108 of the housing in close proximity to the second burst disc 120. The second squib 122 is arranged to heat and weaken the second burst disc 120 in a manner which will allow a pressure which will breach the first disc 118, to also breach the second disc 120.

A plurality of manifold exits 124 are formed through the wall of the pipe 104 to permit gases, which are released into a sub-chamber 126 defined between the partition plate 114 and the second end member 108, through the ports which are opened when one or both of the burst discs 118, 120 are induced to fail, to flow out into a conduit or conduit arrangement (not shown) which directs the gas flow into an air bag or like type of inflatable restraint device (also not shown).

Inasmuch as the construction and arrangement of the pyrotechnic charge is not directly related to the invention, and can be of any suitable known type, a detailed description of the same is omitted for brevity. However, for further reference relating to this aspect of the device, reference may be had by way of example to U.S. Pat. No. 5,482,579 issued on Jan. 9, 1996 in the name of Ochi et al., U.S. Pat. No. 5,439,251 issued on Aug. 8, 1995 i the name of Onishi et al., U.S. Pat. No. 5,431,103 issued on Jul. 11, 1995 in the name of Hoc et al., U.S. Pat. No. 4,948,439 issued on Aug. 14, 1990 in the name of Poole et al., and U.S. Pat. No. 3,613,579 issued on Oct. 19, 1971 in the name of Warren.

Figure 3:
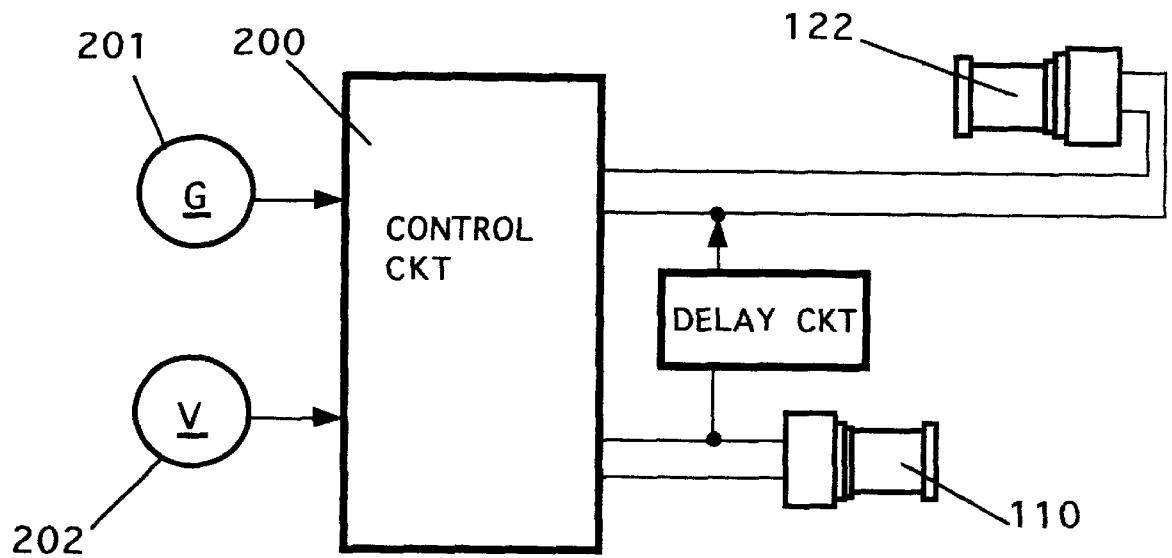
FIG. 3 is a block diagram showing a circuit arrangement which is used to control the number of burst discs which are breached and therefore control the rate of inflation of the air bag restraining device.

As shown in FIG. 3, the two squibs 110 and 122 are operatively connected with a circuit 200 which is responsive to the output of a G sensor 201 which detects vehicular deceleration, for example, and a vehicle speed sensor 202, and is arranged to determine if both squibs 110, 122 need to be fired simultaneously or if only 110 needs to be fired initially.

It will be noted that with this embodiment, it is preferred that both of the squibs 110, 122 be fired. In the case of a high speed collision it is necessary to fire both simultaneously so as to blow (breach) both burst discs 118, 120 and to open both ports in a manner which allows for the most rapid inflation of the air bag restraint system. However, in the case of a low speed collision, the first squib 110 is initially fired and is followed by a delayed ignition of the second one 122. This delay is set to approximately 10oms which allows for a very substantial portion of the pressure which develops in the chamber 116 to be substantially vented. With this delay, the firing of the second squib 122 has essentially no effect on the inflation rate of the air bag and in fact may not result in the second burst disc 120 being breached. That is to say, the heating of the burst disc 120 by the second squib 122 is designed to weaken the second disc 120 to the degree that the elevated pressure which develops in the chamber 116 as a result of the detonation of the pyrotechnic charge 101 will breach it. However, if the heating of the second disc 120 is delayed, the pressure which remains in the chamber 116 at the time that second squib is fired may not in fact be sufficient to actually break the second burst disc 120 and to open the second port.

It will be understood that in the interest of safety, both squibs 110, 120 are preferably fired within a very short period of one another to ensure that very shortly after a collision and the deployment of the air bag restraining system, the unit is rendered totally inert and incapable of further detonations which may induce undesirable side effects. In the case of a severe accident, for example, it would be extremely undesirable for an inadvertently well delayed (e.g. more than 20 seconds) detonation of the second squib to ignite fuel vapors. Unexpected detonations when replacing the air bag after a collision are also eliminated by this delayed firing of squib 122.

Figure 4:
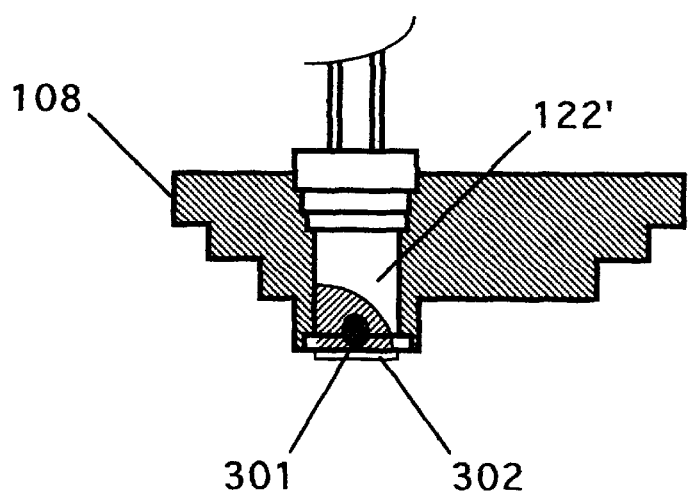
FIG. 4 is a schematic depiction of a modified squib which includes an autoignition pill (AIP) which is used to ignite the second squib with a predetermined delay after the first squib is fired.

Either as an alternative or as a supplement to the delayed firing signal, it is within the scope of the present invention to provide the second squib 122' with an autoignition pill (AIP) 301 in the manner illustrated in FIG. 4. This pill 301 is, as shown schematically in FIG. 4, shielded by a suitable layer 302 so that heat from the hot effluent escaping via sub-chamber 126, is transmitted to the pill 301 with a delay sufficient to ensure that its ignition and the subsequent detonation of the second squib 122' will occur after a delay of approximately 100 ms and have no effect on the number of ports which are opened and that control the inflation rate of the air bag. The provision of the AIP 301 is such as to ensure that the second squib 122 is fired and rendered innocuous irrespective of the control circuit 200 being so damaged by the collision as to be incapable of sending a second delayed ignition signal.

In experiments which were carried out during the development of the present invention, a gas generator was charged with argon at 3112 psi and fired into a 60-liter tank. The burst disc arrangement was such that the sum of the port areas was 75% greater than that of the primary port.

In a simulated high speed collision both ports were opened simultaneously. The primary port was opened by the rising bottle pressure while the secondary port was opened by a combination of the rising pressure and the heat from the second squib 122. The result was a rapid blowdown, with the argon bottle pressure maximizing at 5821 psi in only 10 ms, and the 60-liter tank pressure maximizing at 88.34 psi in 76 ms.

In a simulated low speed collision, only the primary port was opened by the rising argon bottle pressure. The secondary port remained unopened due to the delayed activation of the second squib 122. Because of the reduced flow area, blowdown took place more slowly with the tank pressure not reaching 88.34 psi until 100 ms had elapsed.

The inflation rate of the air bag was correspondingly slower even though the driving force (i.e. the argon bottle pressure) was much higher 12,518 psi, but developed slower maximizing at 23 ms as compared with the 10 ms observed in the simulated high speed collision.

More specific data is set forth in Table 1, which is set forth below.

TABLE 1

MEASURED EFFECT OF PORT THROAT AREA ON PRESSURE AND TIME: HYBRID AIRBAG GAS GENERATOR FIRINGS IN A 60-LITER TANK

| PORT DIA. INCHES | MAX. BOTTLE PRESSURE PSI. | TIME MS | 97% TANK PRESSURE PSI | TIME MS | 97% P-TANK RISE RATE PSI/MS |
| --- | --- | --- | --- | --- | --- |
| 0.171 | 9270 | 21.1 | 55.8 | 61.4 | 9.909 |
| 0.197 | 7843 | 16.0 | 58.4 | 58.0 | 1.007 |

As will be appreciated from the data above, a 33% increase in port area resulted in a 4.6% increase in tank pressure, a 5.5% decrease in rise time, and consequently an 11% increase in tank pressure rise rate, even through the driving force (i.e. the bottle pressure) was reduced by 15%.

Although the present invention has been discussed with reference to one main embodiment, it will be appreciated that the invention is not so limited and that various changes and modifications can made without departing from the scope of the present invention. For example, the generator can be provided with three or more burst discs all but one of which is provided with a squib to selective weaken and permit the pressure which will blow the first, to also breach the one or more of the others. This of course means that instead of two stage change in port area, a three or four stage variation is possible to increase the levels of speed which can be accommodated for. Further modifications can include the disposition of the burst discs in the different partition members/positions.

What is claimed is:

1. An inflation device for a vehicle safety restraint comprising:
    a housing;
    a partition dividing the interior of said housing into a first chamber and second chamber, the first chamber being hermetically sealed, the second chamber being vented by way of a manifold exit opening;
    a pyrotechnic charge disposed in said first chamber;
    means for selectively igniting the pyrotechnic charge;
    a predetermined amount of a predetermined gas stored in said first chamber under a first predetermined pressure;
    first burst disc means closing a first port which connects the first and second chambers, said first burst disc being adapted to fail upon the pressure in the first chamber reaching a second predetermined pressure that is higher than said first predetermined pressure;
    second burst disc means closing a second port which connects the first and second chambers; and
    means for selectively inducing said second burst disc means to fail substantially simultaneously with said first disc means, or thereafter under a pressure which is less than said second predetermined pressure, so that gas is released through both of said first and second ports and at a rate which is essentially proportional to the combined areas of said first and second ports.

2. An inflation device as set forth in claim 1, wherein said selective failure inducing means comprises a squib which is ignited to heat and weaken said second burst disc means.

3. An inflation device as set forth in claim 1, wherein the predetermined gas is a non-toxic gas selected from a group comprising argon and helium.

4. An inflation device as set forth in claim 1, wherein the first predetermined pressure is approximately 3000 psi.

5. An inflation device for use in a vehicle restraint system having an inflatable restraint member, comprising:

a first burst disc operatively disposed between a source of gas under pressure and a discharge opening, said first burst disc being adapted to fail under a predetermined pressure to open a first port connecting the source of gas under pressure and the discharge opening;

a second burst disc operatively disposed between the source of gas under pressure and the discharge opening, said second burst disc being adapted to fail under a pressure in excess of the predetermined pressure to open a second port connecting the source of gas under pressure and the discharge opening; and means for reducing the structural strength of said second burst disc so that it will fail under said predetermined pressure and open the second port, so that gas is released through both of said first and second ports and at a rate which is essentially proportional to the combined areas of said first and second ports.

6. An inflation device as set forth in claim 5, wherein said source of gas under pressure comprises a container which is filled with a predetermined gas under a pressure which is less than the predetermined pressure, and a selectively ignitable pyrotechnic charge which upon ignition produces heated gaseous products which mix with the predetermined gas and produce a gas pressure at least as high as the predetermined pressure.

7. An inflation device as set forth in claim 6, further comprising control means for controlling the ignition timing of said selectively ignitable pyrotechnic charge and controlling said structural strength reducing means to weaken said second burst disc.

8. An inflation device as set forth in claim 7, wherein said control means is responsive to vehicle acceleration and to vehicle speed, and wherein said control means ignites the pyrotechnic charge and controls said structural strength reducing means to reduce the strength of said second burst disc so that it will fail under said predetermined pressure when the vehicle speed is detected as being above a predetermined limit.

9. An inflation device as set forth in claim 8, wherein said control means ignites the pyrotechnic charge and controls said structural strength reducing means to reduce the strength of said second burst disc with a predetermined time delay after the ignition of said pyrotechnic charge when the vehicle speed is detected as being below the predetermined limit.

10. An inflation device as set forth in claim 5, wherein said strength reducing means comprises a squib which is ignited to heat and weaken said second burst disc.

11. An inflation device as set forth in claim 5, wherein said source of gas under pressure includes a pyrotechnic charge and a predetermined amount of gas under a pressure which is less than the predetermined pressure, the pyrotechnic charge being selectively combustible to produce hot gaseous combustion products which mix with and heat the predetermined amount of gas to a pressure at least as high as said predetermined pressure at which said first burst disc will fail and at which said second burst disc will remain intact.

12. An inflation device as set forth in claim 6, wherein the predetermined gas is a non-toxic gas selected from a group comprising argon and helium.

13. A method of controlling the inflation of an inflatable safety restraint device comprising the steps of:

producing gas under pressure by igniting a pyrotechnic charge in a volume of pressurized gas;

breaching a first burst disc and opening a first exit port by exposing the first burst disc to the gas under pressure;

allowing gas to be released at a rate which is essentially proportional to the area of the first exit port;

reducing the structural strength of a second burst disc in response to the detection of a vehicle speed in excess of a first predetermined speed to induce the second burst disc to breach and open a second exit port under the application of the gas under pressure; and allowing gas to be released through both of the first and second exit ports and at a rate which is essentially proportional to the combined areas of the first and second exit ports when the vehicle speed is in excess of said first predetermined speed.

14. A method as set forth in claim 13, wherein the step of reducing the structural strength includes using an ignitable squib to heat and weaken the second burst disc.

15. A method as set forth in claim 14, wherein the ignitable squib is ignited with a predetermined time delay after the pyrotechnic charge is ignited when the vehicle speed is below the predetermined vehicle speed.

16. An inflation device for use in a vehicle restraint system having an inflatable restraint member, comprising:

a first burst disc operatively disposed between a source of gas under pressure and a discharge opening, said first burst disc being adapted to fail under a predetermined pressure to open a first port connecting the source of gas under pressure and the discharge opening;

a second burst disc operatively disposed between the source of gas under pressure and the discharge opening, said second burst disc being adapted to fail under a pressure in excess of the predetermined pressure to open a second port connecting the source of gas under pressure and the discharge opening; and means for reducing the structural strength of said second burst disc so that it will fail under said predetermined pressure and open the second port;

wherein said strength reducing means comprises a squib which is ignited to heat and weaken said second burst disc, said squib including ignition pill means which is responsive to the heat of gases which are released through the first port for causing said squib to ignite with a predetermined time delay after the ignition of said pyrotechnic charge.

* * * * *